(12) United States Patent
Jakobsson

(10) Patent No.: US 6,507,656 B1
(45) Date of Patent: Jan. 14, 2003

(54) NON MALLEABLE ENCRYPTION APPARATUS AND METHOD

(75) Inventor: Bjorn Markus Jakobsson, Hoboken, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/237,522

(22) Filed: Jan. 27, 1999

(51) Int. Cl.[7] ................................................ H04L 9/30
(52) U.S. Cl. .......................................... 380/30; 713/170
(58) Field of Search ............................ 380/30; 713/170, 713/181

(56) References Cited

U.S. PATENT DOCUMENTS

| | | | | |
|---|---|---|---|---|
| 5,265,164 A | * | 11/1993 | Matyas et al. ................. | 380/30 |
| 5,627,893 A | * | 5/1997 | Demyktko .................... | 380/30 |
| 5,901,303 A | * | 5/1999 | Chew .......................... | 395/400 |
| 6,279,118 B1 | * | 8/2001 | Johnson et al. .............. | 713/180 |
| 6,282,295 B1 | * | 8/2001 | Young et al. ................. | 380/286 |
| 6,298,442 B1 | * | 10/2001 | Kocher et al. .............. | 713/194 |

OTHER PUBLICATIONS

Schneier, Bruce, Applied Crytography 1996, John Wiley & Sons, Inc., Second ed., pp. 478–479, 483–494, and 510–512.*

* cited by examiner

*Primary Examiner*—Gilberto Barrón
*Assistant Examiner*—Douglas J. Meislahn
(74) *Attorney, Agent, or Firm*—Walter J. Tencza, Jr.

(57) ABSTRACT

An apparatus comprising an encryption processor and a signing processor is provided. The encryption processor takes a data message and provides an encryption using an encryption process. The signing processor takes the encryption and adds a signature to the encryption using a signing process. The encryption processor can employ ElGamal encryption. The encryption processor may use a function of the encryption to perform the signing process. The signing processor may perform a Schnorr signature process for the signing process. The signing processor uses part of the encryption process to perform the signing process, such as a random number used during the encryption process.

25 Claims, 2 Drawing Sheets

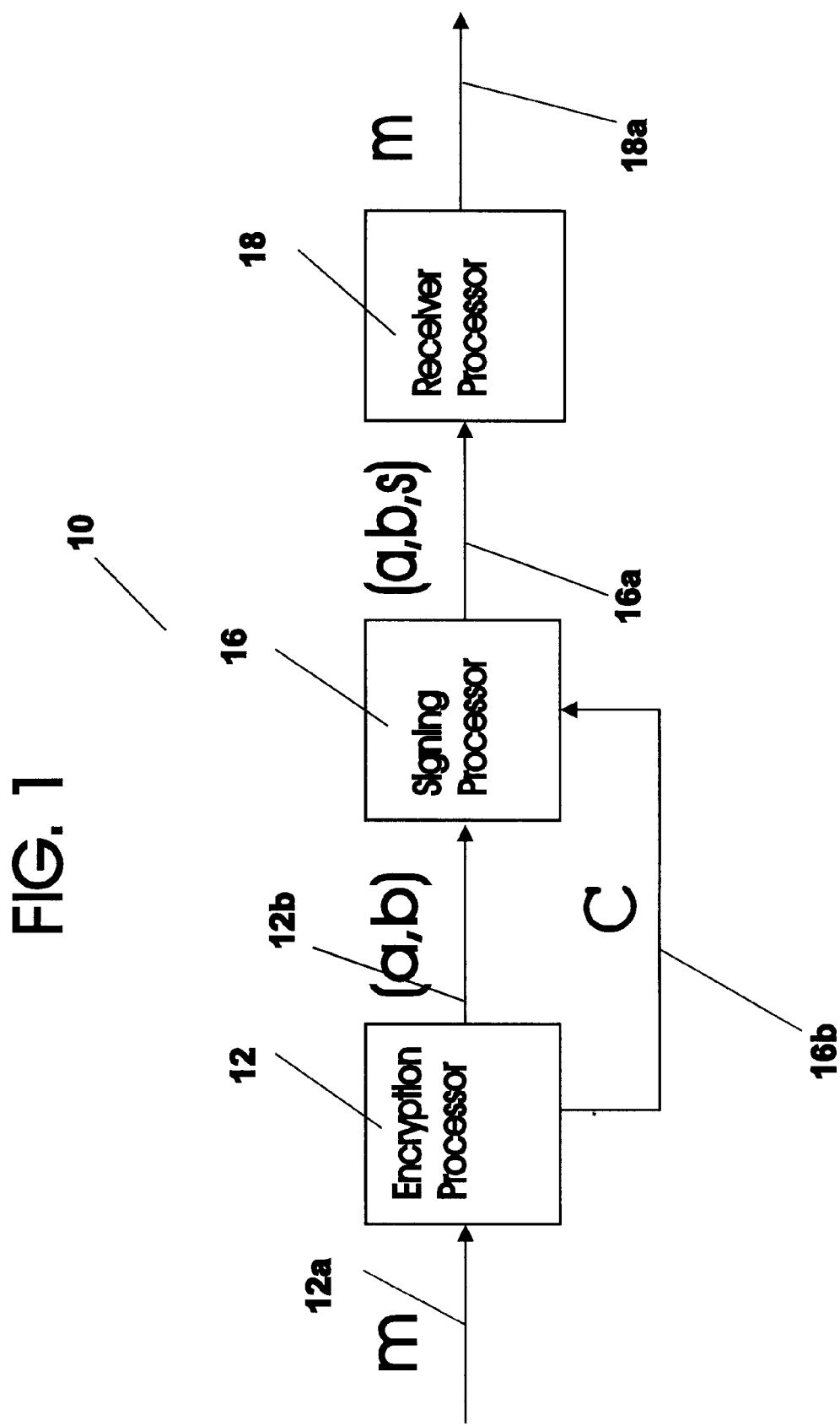

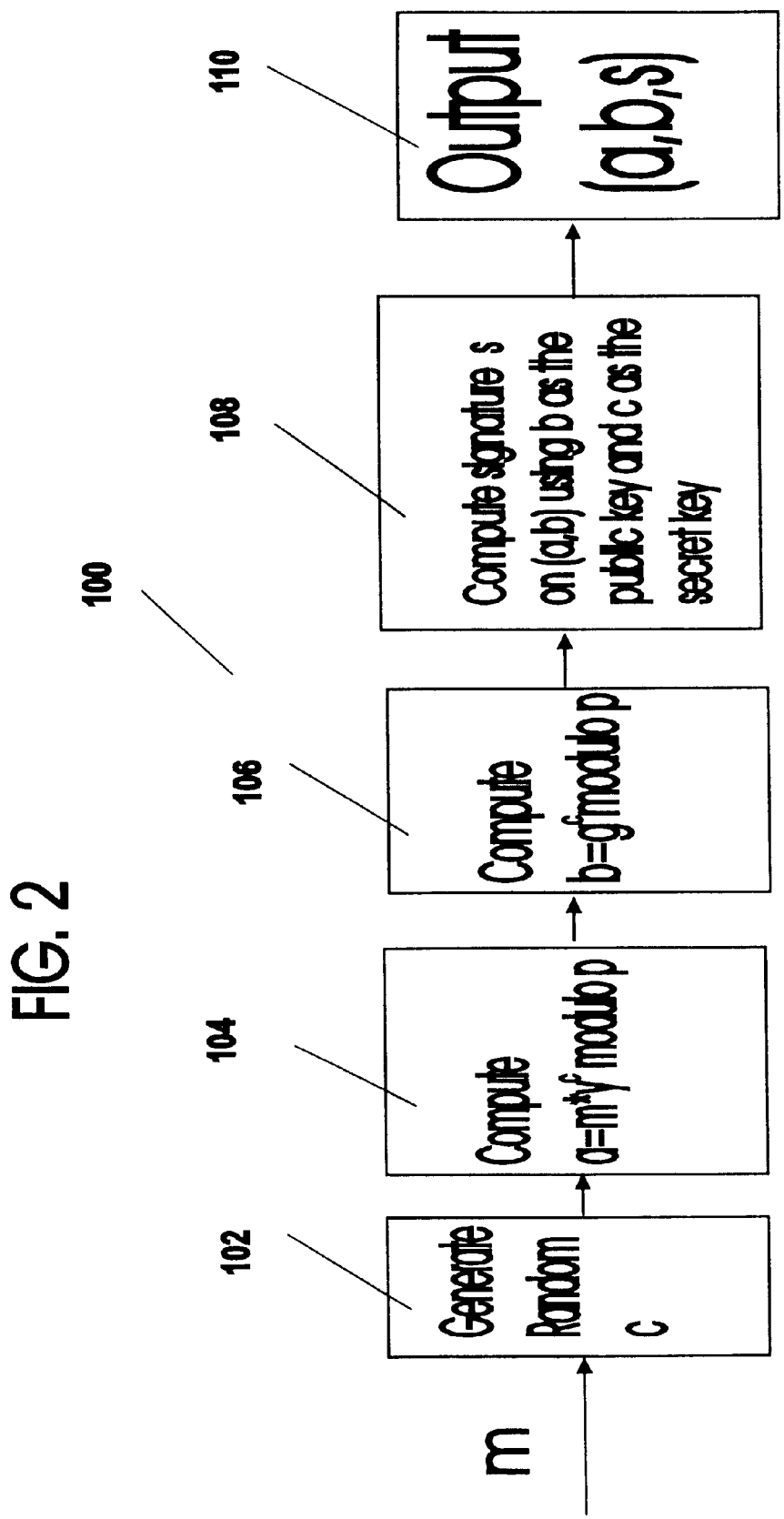

under the control of existing prior art, and it does not show how to prevent malleability.

NON MALLEABLE ENCRYPTION APPARATUS AND METHOD

FIELD OF THE INVENTION

This invention relates to improved methods and apparatus for encryption and decryption of data.

BACKGROUND OF THE INVENTION

The present invention deals with the area of encryption and decryption of data messages. Encryption takes a cleartext message and produces an encrypted message also called a ciphertext. Decryption takes an encrypted message and produces its corresponding cleartext message.

It is known in the prior art how to take a message and turn it into an encrypted message using a first user's public key. The first user upon receiving the encrypted message can then decrypt it, to reveal the original message, using the first user's secret key. The first user's public key is as the name implies, available to the public so that others can send messages to the first user. However, the first user's secret key is not available. The public key is associated with a one-way function, i.e. once the message is encrypted it cannot be decrypted without the secret key even though the public key and the encryption algorithms are known.

El Gamal encryption is a standard method of encryption known in the art. In this method a first processor performing the encryption step, takes a message m as an input; chooses a random value "c", and produces the outputs $a=m*y^c$ modulo p; $b=g^c$ modulo p. For El Gamal decryption, a second processor (which may be the first processor) calculates the data message m from $m=a/b^x$ modulo p. In the above $y=g^x$ modulo p is the public key and x is the secret key. The parameters g, x, and p and other system parameters are picked according to methods known to a person skilled in the art. The parameter g is a generator of the group $G_p$. If we take all possible values of x and compute $g^x$, this result will take all values in the group $G_p$ which is a large set of values. The value c is chosen at random by the entity that performs the encryption.

The ElGamal encryption method has the following weaknesses:

(1) Given an encryption (a,b) of an unknown data message m, it is possible to produce an encryption of a still unknown message, which corresponds to the value dm, by computing (a d modulo p, b). For example, if (a,b) is an encryption of the value m=3, then (a',b')=(4a,b) is an encryption of the value 4m=12. It is not necessary to know m to compute (a',b') from (a,b).
(2) Given the encryption pair or ciphertext (a,b) of data message m, it is possible to produce a ciphertext of $m^d$ as ($a^d$ modulo p, $b^d$). For example, a correct message could be raised to some exponent and there would be no way of telling that had occurred.
(3) Given two ciphertexts (a1, b1) and (a2, b2), with (a1, b1) being an encryption of m1 and (a2, b2) being an encryption of m2, it is possible to produce a ciphertext of the product of m1*m2 modulo p as (a1*a2 modulo p, b1*b2 modulo p).

These three disadvantages and other and related ones are referred to in literature as malleability. Malleability is a threat to security, correctness of decryption of a message, and privacy in many situations. For example in an auction scenario if an offer for a product by a first individual is m$, given the ciphertext a second individual can overbid and make his offer 2*m without knowing how much "m" is but knowing that the second individual will win the bidding process. Using a similar attack one can duplicate votes in an election to determine (later when all votes are decrypted) what you voted (by looking for a duplicate). In the prior art malleability is avoided by forcing the value of the data message m to be encrypted to be of a particular form, such as to always end in a particular string of length approximately 100 bits. This technique of avoiding malleability has two disadvantages:

(a) First, it is not possible to determine that an encrypted message is of the valid form without decrypting it.
(b) Secondly, this is not known to result in a problem-free system (i.e. a 'non-malleable encryption') and cannot be proved to result in a non-malleable encryption.

However currently there are no other approaches better at dealing with the malleability problem without losing efficiency of the resulting scheme and ciphertext.

SUMMARY OF THE INVENTION

The present invention uses an encryption technique and a signing technique to provide a non-malleable encryption. An encryption processor takes a data message and produces an encryption using an encryption process. The encryption may also be called a ciphertext and typically would be comprised of first and second ciphertext portions. A signing processor takes the encryption and adds a signature to the first and second ciphertext portions using, for example, the second ciphertext portion as the public key for the signature. A receiver processor receives the ciphertext and the signature, decrypts the ciphertext to form a first data message, and determines if the first data message is valid by verifying the signature.

The encryption processor may employ ElGamal encryption for the encryption process to form the encryption. The signing processor may perform a Schnorr signature process for the signing process or any other similar discrete log based signature, as appreciated by those skilled in the art. The signing processor may use part of the encryption process to perform the signing process.

BRIEF DESCRIPTION OF THE DRAWINGS

FIG. 1 shows a diagram of an apparatus in accordance with a first embodiment of the present invention; and FIG. 2 shows a flow chart of a method in accordance with an embodiment of the present invention.

DETAILED DESCRIPTION OF THE DRAWINGS

In one embodiment an apparatus comprising an encryption processor and a signing processor is provided. These processors may in fact be part of the same personal computer. For some purposes the encryption processor and signing processor may need to be one and the same processor. For example, there are two parts of the standard El Gamal ciphertext, but these share the same value 'c', and so, the value "c" would be known by both the encryption processor and the signing processor. In fact the encryption processor and the signing processor may all need to be part of one and the same processor in some situations. The signature part may also use the value of c, and therefore, at least for the above example, needs to be part of the same processor or party.

FIG. 1 shows an apparatus 10 comprised of an encryption processor 12 and a signing processor 16. The signing processor is connected to a receiver processor 18. The processors 12 and 16 may actually be part of a single processor which may be a personal computer. The receiver processor 18 typically would be a separate personal computer but may also be part of the same personal computer.

In the apparatus 10 the encryption processor 12 has an input port 12a. The encryption processor 12 is also connected to the signing processor 16 via communications link 12b. Communications link 12b, and the other communications links mentioned herein, may be any apparatus for linking computers or circuitry such as a port connected to another port by a wire or a fiber. The signing processor 16 is connected to the receiver processor 18 via communications link 16a. The receiver processor 18 has an output port 18a. The encryption processor 12 is also connected to the signing processor 16 via port communications link 16b. It should be noted that one or more or all of the encryption processor 12, signing processor 16, and receiver processor 18 may be implemented in a single processor through a single piece of computer software.

The operation of the apparatus 10 of FIG. 1 is as follows and is also shown in part in the flow chart 100 of FIG. 2. A plaintext message "m" is sent to the input port 12a of encryption processor 12. The plaintext message may be a digital data message. The message "m" is encrypted by the encryption processor 12 using a method such as ElGamal encryption or some other known encryption process. The encryption pair or encryption (a,b) is produced on communications link 12b and sent to the signing processor 16. The encryption process performed by the encryption processor 12 is shown in steps 102, 104, and 106 of FIG. 2. As shown in FIG. 2 for the input message "m", a random number "c" is first generated at step 102. The random number "c" is used to calculate the quantity $a=m*y^c$ modulo p and the quantity $b=g^c$ modulo p at the steps 104 and 106 in FIG. 2. The value "c" in this example would be in the range of $0<=c<=q$; where q is the size of $G_p$.

The encryption pair (a,b) is sent to the signing processor 16. The random number c is also sent to the signing processor 16 from the encryption processor 12 via the communications link 16b. At step 108 of FIG. 2, the signing processor 16 uses the random number 'c' which was chosen for the encryption process by encryption processor 12, to obtain a signature "s". The signing processor 16 may then execute step 110 of FIG. 2 by outputting the triplet (a,b,s) to the receiver processor 18.

The value for the sign "s" can be obtained for example by using the Schnorr signature scheme. For that scheme the following steps are followed:

(1) a random value k is picked where $1<=k<=q$;
(2) $r=g^k$ modulo p is computed;
(3) $\sigma=k-xh(M,r) \mod q$ is computed; where h ( ) denotes a so-called hash function; and $M=(a,b)$ is the message to be signed.
(4) Output the signature $(r, \sigma)$ which is what we call the signature "s";

The receiver processor 18 may use the input of $(M, r, \sigma)$ in order to verify the signature and thus verify that the decrypted message is a decryption of a valid data message by verifying if $r=g^\sigma y^{h(m,r)}$ modulo p. The above signature generation and verification is well known to those skilled in the art.

The signature "s" is appended to the encryption pair (a, b) to form the triplet (a,b,s) and this is output on communications link 16a, as shown by step 110 in FIG. 2. This triplet is received at the receiver processor 18. The receiver processor 18 can then decrypt the encryption pair (a,b) to obtain the original message m by calculating $m=(a/b)^x$; where x is the secret decryption key of a user. The receiver processor 18 can also use the value "b" as a public key to determine if the triplet (a,b,s) is valid or not tampered with.

Encryption methods, other than ElGamal can be used, particularly variations of ElGamal. Signature methods other than Schnorr can be used such as Digital Signature Standard (hereinafter "DSS") which is a U.S. signature standard. Instead of a signature method, a proof-of-discrete-log system can be used. Several such methods are well known in the literature.

The Schnorr signature process uses one or both portions (a, b) of the standard ElGamal encryption as a public key, most likely just the portion 'b' of the standard ElGamal encryption and the corresponding secret portion (the random number 'c' above), to sign a message. A signature 's' is provided with the encrypted message. The signature 's' is a function of the encrypted message (a, b), potentially including publicly available information, such as the time or date. It can be publicly verified by anybody who gets the ciphertext, but can only be generated by a party with knowledge of the secret random number "c" used for encryption used for encryption. In the example referred to, the signer's secret key is based on the random number "c" which is used by the entity or processor, such as encryption processor 12, which encrypts a message, such as message "m", and said encryption processor also preferably functions as a signing processor 16 which computes the ciphertext (a,b,s). The overall encryption data is now a triplet of (a,b,s). In this case (a,b) or portions thereof act as the public key, (a,b) or a function thereof is the message and "s" is the signature. The ciphertext (referring to (a,b, and s)) is said to be valid if "s" is the signature on (a,b) with respect to the chosen public key (which is (a,b, or functions of these)).

This new encryption method can be proved to be non-malleable, i.e. given some number of ciphertexts $(a_i, b_i, s_i)$, it is impossible to produce a new or valid ciphertext from the old ciphertexts, or a new and valid ciphertext with a plaintext message in any known way related to the plaintext messages corresponding to the old ciphertexts. Furthermore, the validity of a ciphertext can be publicly verified in an efficient manner using our proposed methods and apparatus. It retains the property that given a ciphertext (a,b,s), and two potential plaintext messages m1 and m2, it is impossible to determine which one corresponds to (a,b,s). The new ciphertext (a,b,s) as opposed to the old (a,b), is decrypted as before, i.e. by calculating $m=a/b^x$ modulo p after verifying that (a,b,s) is a valid ciphertext.

I claim:

1. An apparatus comprising:
   an encryption processor;
   a signing processor;
   wherein the encryption processor receives a data message and produces a first ciphertext using an encryption process;
   the signing processor receives the first ciphertext and adds a signature to the first ciphertext using a first signing process, resulting in a second ciphertext corresponding to the data message; and
   wherein the signature is a function of the first ciphertext and the signature can be publicly verified by any receiving processor which receives the first ciphertext and the signature, by using at least part of the first ciphertext as a public key to verify the signature.

2. The apparatus of claim 1 wherein said encryption process employs ElGamal encryption.

3. The apparatus of claim 1 wherein said first signing process performs a Schnorr signature process.

4. The apparatus of claim 1 wherein said first signing process performs a Digital Signature Standard ("DSS") signature process.

5. The apparatus of claim 1 wherein said first signing process performs a discrete log based signature scheme.

6. The apparatus of claim 1 wherein said first signing process uses part of the encryption process.

7. The apparatus of claim 1 wherein the signing processor performs a discrete log based proof scheme.

8. The apparatus of claim 2 wherein said first signing process employs a Schnorr signature process.

9. The apparatus of claim 2 wherein said first signing process uses a random number used to perform the encryption process.

10. The apparatus of claim 2 wherein said first signing process employs a Digital Signature Standard ("DSS") signature process.

11. The apparatus of claim 3 wherein said first signing process uses a random number used to perform the encryption process.

12. The apparatus of claim 2 wherein the first signing process uses a discrete log based signature or proof scheme signature process.

13. The apparatus of claim 4 wherein the first signing process uses a random number used to perform the encryption process.

14. An apparatus comprised of:

a receiver processor which receives a ciphertext having a first portion and a second portion, and a signature, wherein the receiver processor decrypts the ciphertext to obtain a first data message;

and the receiver processor determines whether the first data message is valid by verifying the signature; and wherein the signature is a function of the ciphertext and the signature can be publicly verified by any receiving processor which receives the ciphertext and the signature, by using at least part of the first ciphertext as a public key to verify the signature.

15. The apparatus of claim 14 and wherein:

the signature is verified by using a Schnorr Signature verification method.

16. The apparatus of claim 14 and wherein:

the signature is verified by using a Digital Signature Standard ("DSS") verification method.

17. An apparatus comprising:

an encryption processor;

a signing processor;

wherein the encryption processor receives a data message and produces a first ciphertext using an encryption process;

the signing processor receives the first ciphertext and adds a signature to the first ciphertext using a first signing process, resulting in a second ciphertext corresponding to the data message;

wherein said first signing process uses part of the encryption process; and wherein said first signing process uses a random number used to perform the encryption process wherein the signature is a function of the first ciphertext and the signature can be publicly verified by any receiving processor which receives the first ciphertext and the signature, by using at least part of the first ciphertext as a public key to verify the signature.

18. A method comprising the steps of:

receiving a data message;

encrypting the data message to form a first ciphertext; and performing a signing process on the first ciphertext resulting in a second ciphertext having a signature; and wherein the signature is a function of the first ciphertext and the signature can be publicly verified by any receiving processor which receives the first ciphertext and the signature, by using at least part of the first ciphertext as a public key to verify the signature.

19. The method of claim 18 and further comprised of the steps of:

decrypting the second ciphertext to form a decrypted data message;

and verifying that the decrypted data message is a decryption of a valid data message by verifying that the signature is valid.

20. The method of claim 18 and wherein:

the step of encrypting the data message to form a first ciphertext employs El Gamal encryption.

21. The method of claim 19 and wherein:

the step of encrypting the data message to form a first ciphertext employs El Gamal encryption.

22. The method of claim 18 and wherein:

the step of performing a signing process employs a Schnorr signature process.

23. The method of claim 19 and wherein:

the step of performing the signing process employs a Schnorr signature process.

24. The method of claim 18 wherein:

the step of the performing the signing process is based at least in part on the step of encrypting.

25. A method comprising the steps of:

receiving a data message;

encrypting the data message to form a first ciphertext; and performing a signing process on the first ciphertext resulting in a second ciphertext having a signature;

wherein the step of the performing the signing process is based at least in part on the step of encrypting;

and wherein the step of the performing the signing process is based at least in part on a random number used to perform the step of encrypting; and wherein the signature is a function of the first ciphertext and the signature can be publicly verified by any receiving processor which receives the first ciphertext and the signature, by using at least part of the first ciphertext as a public key to verify the signature.

* * * * *